UNITED STATES PATENT OFFICE.

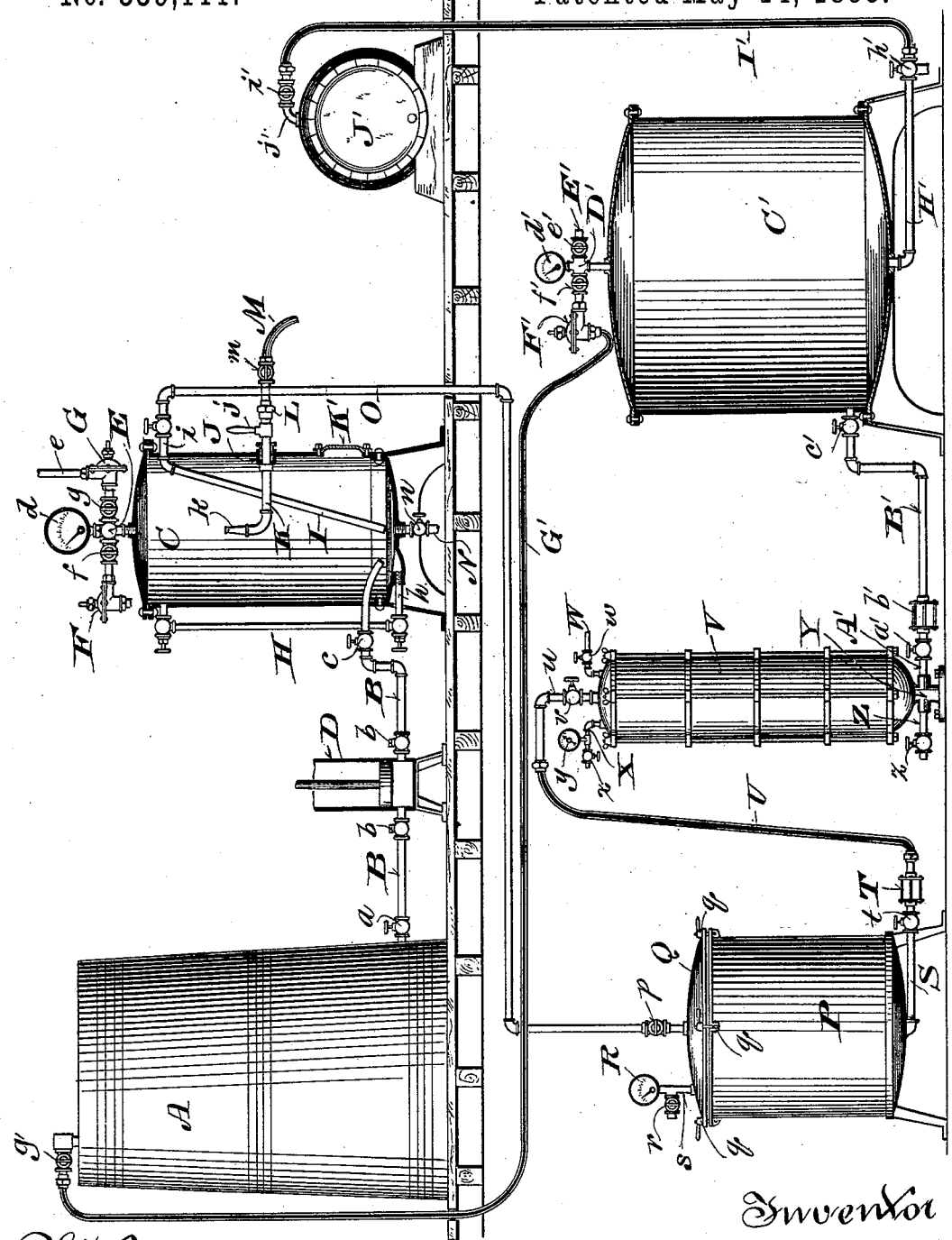

OTTO ZWIETUSCH, OF MILWAUKEE, WISCONSIN.

METHOD OF AND APPARATUS FOR FILTRATION AND CARBONATION OF BEER, &c.

SPECIFICATION forming part of Letters Patent No. 539,111, dated May 14, 1895.

Application filed July 18, 1894. Serial No. 517,847. (No model.)

*To all whom it may concern:*

Be it known that I, OTTO ZWIETUSCH, a citizen of the United States, and a resident of Milwaukee, in the county of Milwaukee, and in the State of Wisconsin, have invented certain new and useful Improvements in Methods of and Apparatus for the Filtration and Carbonation of Beer and other Malt Liquids; and I do hereby declare that the following is a full, clear, and exact description thereof.

My invention invention relates especially to filtration and carbonation of beer, and consists in certain peculiarities in the construction and arrangement, and in the combination of parts in the apparatus employed, as well as in certain peculiarities in the method of filtration and carbonation, all as will be fully set forth hereinafter and subsequently claimed.

The drawing is a representation in elevation and partially in section of the apparatus forming part of my present invention employed by me to carry my said method into effect.

The usual method of supplying beer to a filter consists in tapping the hogsheads or other vessels which contain the same near to the bottom thereof, and supplying air under pressure within said vessels, above the beer, so as to force the latter, under a suitable pressure, through the filter. In some instances, especially when the beer is taken from high tanks on an upper floor above the plane of the filter, the requisite pressure may be obtained solely by the elevation of the liquid column itself, or partly by this, and partly by the described air pressure. The beer is taken from the lower part of the tank, and as such tanks are frequently twelve, sixteen or even eighteen feet in height, it follows that between the beginning and end of the operation of filtering there will be a very considerable variation in pressure which may be from five to seven pounds, and hence to obtain a steady pressure upon the beer in the filter, the air pressure must be increased as the liquid gets low in the tank above, besides which, if the supply tank becomes empty, the entire operation has to be stopped for a time to connect the filter to a full tank again.

The principal object of my present invention is to maintain a continuous supply of beer to the filter and carbonator and to keep the pressure in said filter and carbonator as nearly constant as possible.

Referring to the drawing, A represents a beer standard, tank or other vessel, having at the top an inlet provided with a cock $g'$, and if the elevation of the tank A is sufficient to give the requisite degree of pressure, the hose G' shown in the drawing is disconnected from the said inlet, and the cock $g'$ is opened so that air may enter the tank A, through said inlet. From the lower part of this tank a pipe B, having cock $a$ close to said tank, leads to the inlet cock $c$ of vessel C, hereinafter described, a pump D, having suitable pump valves $b\ b$, being interposed in said pipe B, for use when necessary, only the lower part of said pump being shown.

The vessel C, which I term my intermediate supplying vessel, is vertically arranged, and at its upper end it is provided with a four-way bung E, one branch of which leads into the top of said vessel, the opposing vertical branch leading to a pressure gage $d$, while one of the lateral branches leads to a pressure-relief valve F, which has its outlet to the open air, and the other branch leads to the inlet of a pressure-regulating valve G, suitable stop-cocks $f$ and $g$ being interposed in said lateral branches between the bung E and the said valves F and G, and there being an air-supply pipe $e$, connected as shown to the valve G. The vessel C is provided with a liquid-gage H for practically its entire height, the lower end of said gage being connected, by pipe $h$, with the bottom of said vessel. I is a beer outflow pipe within the vessel C, extending from a point close to the center of the bottom thereof up to the upper part, where it connects with an outlet-pipe $i$ passing out through said vessel, and which latter is provided with a suitable cock, as shown.

J is a stuffing-box in the vertical wall of the vessel C, and through this stuffing-box there passes a hose-nipple K, terminating, within the vessel, in a curved nozzle $k$, having a closed end provided with a series of minute perforations. This nipple has a handle $j$ on the outside of the vessel C, adjacent to the coupling L, which connects with a pipe M, leading from a source of water supply, said pipe being provided with a suitable cock $m$. By means of the handle $j$, the hose nipple K can be turned at pleasure, so as to thoroughly wash out all portions of the interior of the vessel C, when the water is supplied through the pipe M, keeping the said vessel meanwhile closed, and then the dirty water and its accumulations can be let out by opening the cock $n$ in the bottom outlet pipe N, and access to the interior of the vessel C can be had at any time through the hand-hole K′.

O is a pipe connected to the described beer outlet pipe $i$, said pipe O leading to the filter P, and entering through the top thereof, there being a suitable cock $p$ adjacent to this point. This filter has an upper inlet chamber, and suitable filling, and may be of any approved or suitable construction (such for instance as that shown in my prior patent, No. 504,145, dated August 29, 1893,) having preferably a separable top Q, with suitable fastening devices $q\ q\ q$, and a cock $r$ for regulating the admission of air to said filter or its expulsion therefrom, and a pressure gage R, both connected to a pipe $s$ connected to the filter top Q.

S is a beer outlet pipe leading from the bottom of said filter and provided with a suitable cock $t$, just beyond which is a transparent section T and beyond this a preferably flexible pipe U leading to the inlet pipe $u$ of a carbonator V of any suitable construction, the inlet pipe having a cock $v$, said carbonator being further provided with a carbonic acid gas inlet pipe W and cock $w$, an air and gas outlet pipe X with an escape cock $x$, and pressure gage $y$, and a beer outlet Y at its base, the latter connecting with a water inlet and outlet pipe Z, provided with a cock $z$, and with a beer outlet pipe A′, having a cock $a'$.

C′ is a receiving tank, and B is a pipe leading thereto from the beer outlet pipe A′ of the carbonator, said pipe being provided with an interposed transparent section $b'$, and with a cock $c'$ adjacent to said receiving tank C′. D′ is a four-way bung, the lower vertical branch whereof is inserted in the top of said receiving tank C′, while its upper vertical branch connects with a pressure gage $d'$. One of its lateral branches connects with an air supply pipe E′ and its other lateral branch with a pressure-relief valve F′, there being suitable stop cocks $e'$ and $f'$ interposed in said lateral branches, as shown. Ordinarily, the relief valve F′ blows off to the open air, but under some circumstances, as hereinafter described, the blow-off pressure passing out of valve F′ may be re-used, by means of pipe G′, connected as shown in the drawing to the valve F′ and to the air inlet at the top of tank A. From the bottom of the receiving tank C′ there extends a pipe H′ having an outlet cock $h'$, said pipe connecting with a preferably flexible filling pipe I′ provided with a cock $i'$ and terminating in a suitable nozzle $j'$ for connection with the bung hole of the shipping cask or final receptacle J′.

The pressure relief valve F′ has a regulating nut on its upper part, and the pressure passing out of tank C′ is regulated by turning or screwing this nut. By turning the nut downward, a higher pressure is obtained, while by turning it upward a lower pressure is obtained. One full turn of the nut gives or represents one pound of pressure, which amount may be indicated on the stem that passes through said nut.

Before commencing the operations of filtration and carbonation, I prepare the apparatus, as follows: Connect the air-supply pipe $e$ of vessel C with the air reservoir or pump under pressure, in common use in breweries. Regulate the desired pressure, which in the arrangement of parts shown in the drawing would be accomplished by setting valve G to ten pounds, and relief valve F to ten and a half pounds. Fill the tank C′ with air pressure, through pipe E′ until the gage indicates seven pounds, when cock $e'$ must be closed. See that valve F′ is ready to blow off to the open air. Then open cock $f'$ and regulate the nut, so that the valve blows off by seven pounds of pressure. Have the filter properly packed, fill the carbonator with water, and have the supply of gas pressure to the carbonator set at say twelve pounds, and the gage of the filter set at say fourteen pounds. Expel the water in the carbonator by letting in the gas, and the apparatus is ready for use. By reason of the intermediate vessel C being on a higher plane than that of the filter P, there will be an increased pressure in the inlet chamber of the filter resulting from this elevation of the vessel C over the pressure in the vessel C and it is only necessary that there should be an appreciable decrease of pressure in each succeeding vessel all the way to the receiving tank C′ in order to induce the necessary flow thereto. Therefore, if the vessel C stood on the same plane with the filter P, the former vessel should have a somewhat higher pressure than the latter, but in the illustration given this is accomplished by the height of the liquid column in the pipe O in addition to the described pressure in the vessel C.

In the operation of my apparatus, the beer is supplied from the tank A to the vessel C through the pipe B. If there is a sufficient quantity of beer in the tank A or if the tank A is on a higher level than vessel C, then the supply may be by gravity, but if this is not enough, the pump D may be used, or additional pressure may be supplied to the tank A above the liquid therein. The supply of beer passing into vessel C should always be kept to approximately the same level therein, but a variation of four to six inches in height will do no harm. The liquid gage H must be kept under inspection and the supply regulated to avoid greater variation than above noted, in order that the pressure at the inlet of the filter may be kept substantially constant. By reason of the described pressure-relief-valve F, and pressure-regulating-valve G, the pressure within the vessel C is kept substantially constant, for if the beer supplied to said vessel rises above the desired level the excess of pressure thereby occasioned instantly blows off through the valve F, and if the beer supply diminishes at any time the regulating valve G operates to keep the pressure up to the desired degree.

There may be a series of receiving tanks C' for the purpose of storing the beer for a time after carbonation, instead of filling the ultimate receptacles J' directly through the said tanks C', in a continuous process, and under such circumstances the described pipe G' is connected to the relief valve F' of the particular receiving tank C' which is at the time connected to the carbonator V, and the other end of this pipe G' is then connected to the described air-inlet of the tank A, so that, as the height of the liquid column in the tank A diminishes to the point of not having sufficient pressure to force the beer into the vessel C, then the blow-off pressure from the receiving tank C' escapes (as the beer rises in tank C') through the valve F' and passes through said pipe G' into the tank A, being thus utilized to force the beer out of the said tank A, the valve F' being regulated from time to time according as the level in tank A is lowering.

When there is a continuous passage of the carbonated beer through the receiving tank C' to the ultimate receptacle J' then the pipe G' is detached from the valve F' and any excess of pressure in the tank C' blows off to the open air, and if the pressure within the tank A becomes insufficient to force the beer to the vessel C the pump D may be brought into action.

From the foregoing it will be seen that by reason of interposing the described intermediate supplying vessel C between the beer supply tank or standard A, and the filter, and operating the same in the manner described, I am enabled to maintain a substantially constant pressure at the inlet of said filter, and to filter the beer and lead it to the carbonator continuously, under this practically constant pressure, whether the supply tank A is practically full or containing only a few inches of beer, and without any stoppage of the operation, during the time necessary to disconnect the pipe B from an empty tank A and connect it to a full supply tank.

Having thus described my invention, what I claim as new, and desire to secure by Letters Patent, is—

1. The herein described method of filtering and carbonating beer, which consists in conveying the beer from a standard, tank or other vessel to a filter, through an intermediate supplying vessel, in which the pressure is maintained without material variation irrespective of the amount of beer in the said standard or tank at any time, and thence passing said liquid through said filter, and to and through a carbonator under substantially constant pressures therein and without interrupting the flow of beer to said filter and carbonator while the said intermediate supplying vessel is being disconnected from an empty standard or tank and attached to a full one.

2. In the filtration and carbonation of beer and other malt liquids, the herein described method which consists in supplying the filter with said liquid from a standard, tank or other vessel, through an intermediate supplying vessel in which a substantially constant pressure is maintained, forcing the liquid under constant pressure to the inlet chamber of the filter, forcing it through the filter under constant pressure to the carbonator, and leading it from there under a substantial counter-pressure into a receiving tank, and from thence to the usual ultimate receptacle for the market without interrupting the flow of beer to said filter and carbonator while the said intermediate supplying vessel is being disconnected from an empty standard or tank and attached to a full one.

3. In apparatus for the filtration and carbonation of beer and other malt liquids, the combination with a standard, tank or other vessel, and a filter, of an intermediate supplying vessel provided with a pressure regulating device, and a pipe for air or gas under pressure leading thereto, a receiving tank provided with a pressure regulating device and an air or gas supply pipe leading thereto, and a pipe leading therefrom back to the standard or tank, and a carbonator interposed between and connected to said filter and receiving tank.

4. In apparatus for the filtration and carbonation of beer and other malt liquids, the combination with a standard, tank or other vessel, and a filter, of an intermediate supplying vessel provided with a pressure regulating device and a pipe for air or gas under pressure leading thereto, a pipe leading from the lower part of the said standard, tank or other vessel to the lower part of the said intermediate vessel, an outflow pipe within the last named vessel leading from a point adjacent to the bottom thereof to a point adjacent to the top thereof, an outlet pipe connecting with the outflow pipe at this latter highest point, a pipe leading from the said outlet pipe to the said filter, and a liquid outlet pipe leading from the lower part of said filter.

5. In apparatus for the filtration and carbonation of beer and other malt liquids, the combination with a supplying vessel, having cock-controlled inlet and outlet pipes, of a bushing in the wall thereof, a hose nipple revoluble therein, a coupling on said nipple exterior to said vessel for connection with a water supply pipe, and a handle on said nipple adjacent to said coupling, and a curved nozzle on said nipple within said vessel.

6. In apparatus for the filtration and carbonation of beer and other malt liquids, the combination with a standard, tank or other vessel, and a filter, of an intermediate supplying vessel adapted for attachment to different standards or tanks without interrupting the continuous operation of the apparatus, and provided with a pressure regulating device and a pipe for air or gas under pressure leading thereto, a pipe leading directly from said intermediate supplying vessel to said filter, a carbonator connected to said filter, and a pump located between the standard or tank and the said intermediate supplying vessel.

7. In apparatus for the filtration and carbonation of beer and other malt liquids, the combination with a standard, tank or other vessel, and a filter, of an intermediate supplying vessel adapted for attachment to different standards or tanks without interrupting the continuous operation of the apparatus, and provided with a pressure regulating device and a pipe for air or gas under pressure leading thereto, a pipe leading directly from said intermediate supplying vessel to said filter, and a pump located between the standard or tank and the said intermediate supplying vessel.

8. In apparatus for the filtration and carbonation of beer and other malt liquids, the combination with a standard, tank or other vessel, and a filter, of an intermediate supplying vessel adapted for attachment to different standards or tanks without interrupting the continuous operation of the apparatus, and provided with a pressure regulating device and a pipe for air or gas under pressure leading thereto, a receiving tank provided with a pressure regulating device and an air or gas supply pipe leading thereto a pipe leading directly from said intermediate supplying vessel to said filter, a carbonator interposed between and connected to said filter and receiving tank, a filling pipe leading from said receiving tank, and a pump located between the standard or tank and the intermediate supplying vessel.

9. In apparatus for the filtration and carbonation of beer and other malt liquids, the combination with a standard, tank or other vessel, and a filter, of an intermediate supplying vessel adapted for attachment to different standards or tanks without interrupting the continuous operation of the apparatus, and provided with a pressure regulating device, and a pipe for air or gas under pressure leading thereto.

In testimony that I claim the foregoing I have hereunto set my hand, at Milwaukee, in the county of Milwaukee and State of Wisconsin, in the presence of two witnesses.

OTTO ZWIETUSCH.

Witnesses:
H. G. UNDERWOOD,
HENRY DANKERT.